F. J. PALMA.
ROCK CUTTING MACHINE.
APPLICATION FILED APR. 6, 1918.
1,419,980.
Patented June 20, 1922.
6 SHEETS—SHEET 4.
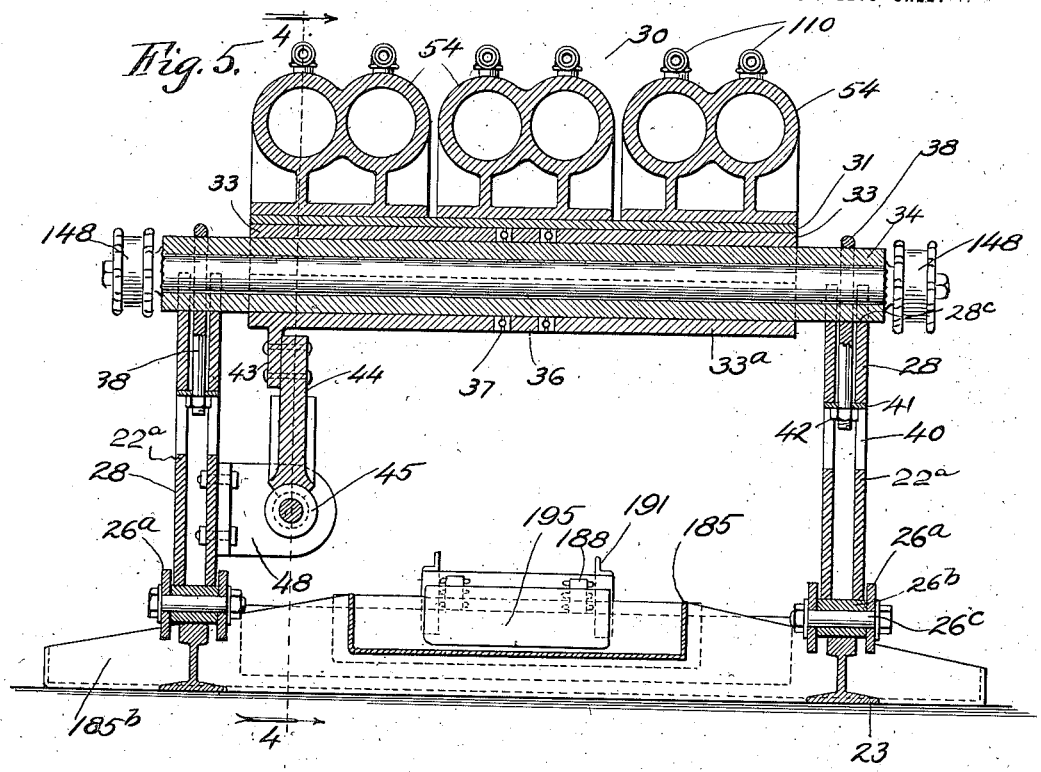
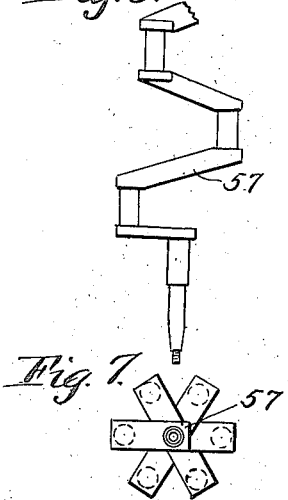
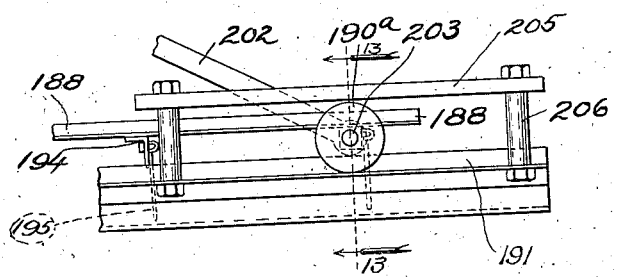
Witness:
C. C. Burnap
Inventor:
Frederic J. Palma
By Sheridan, Sheridan & Smith, Attys

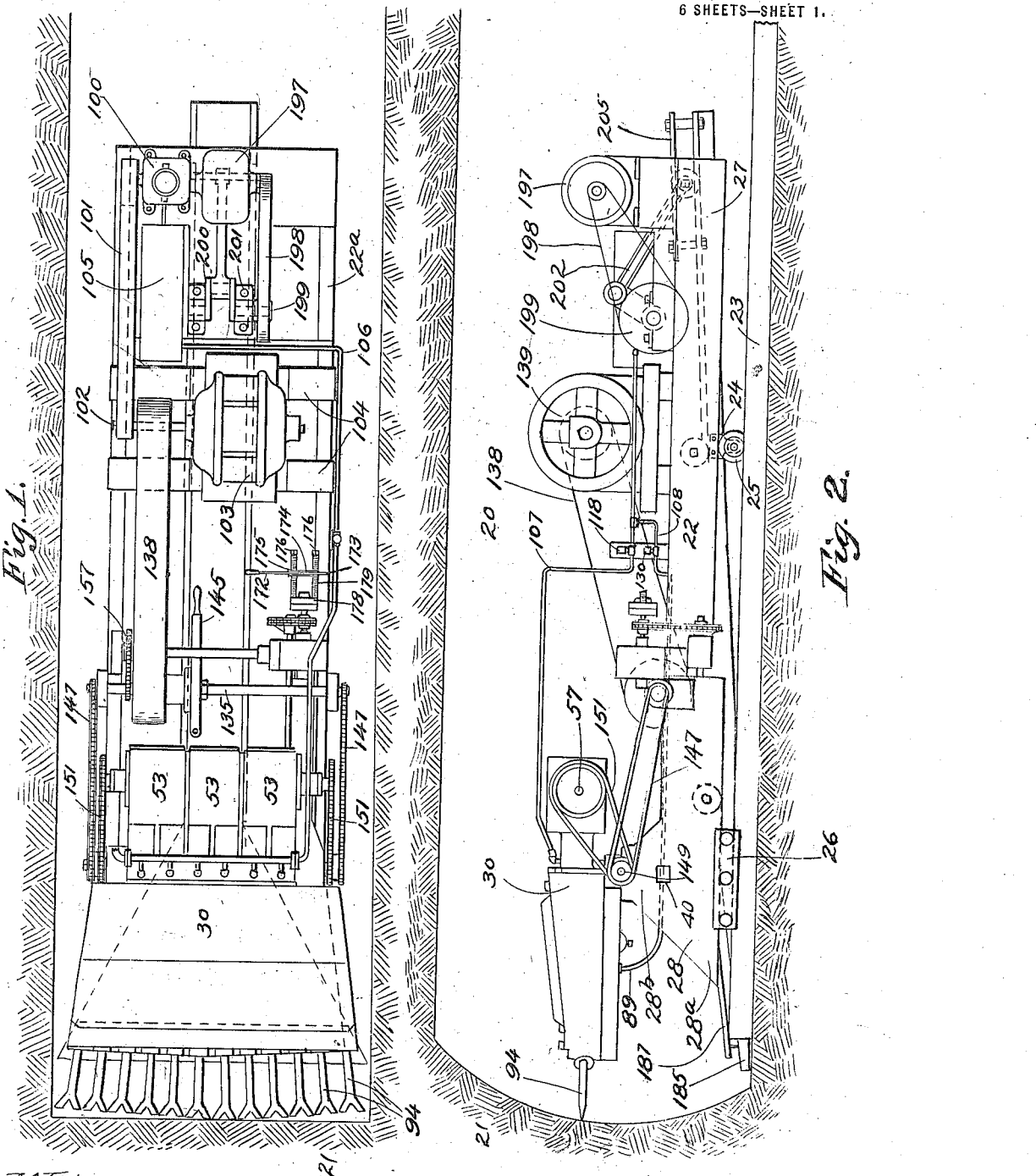

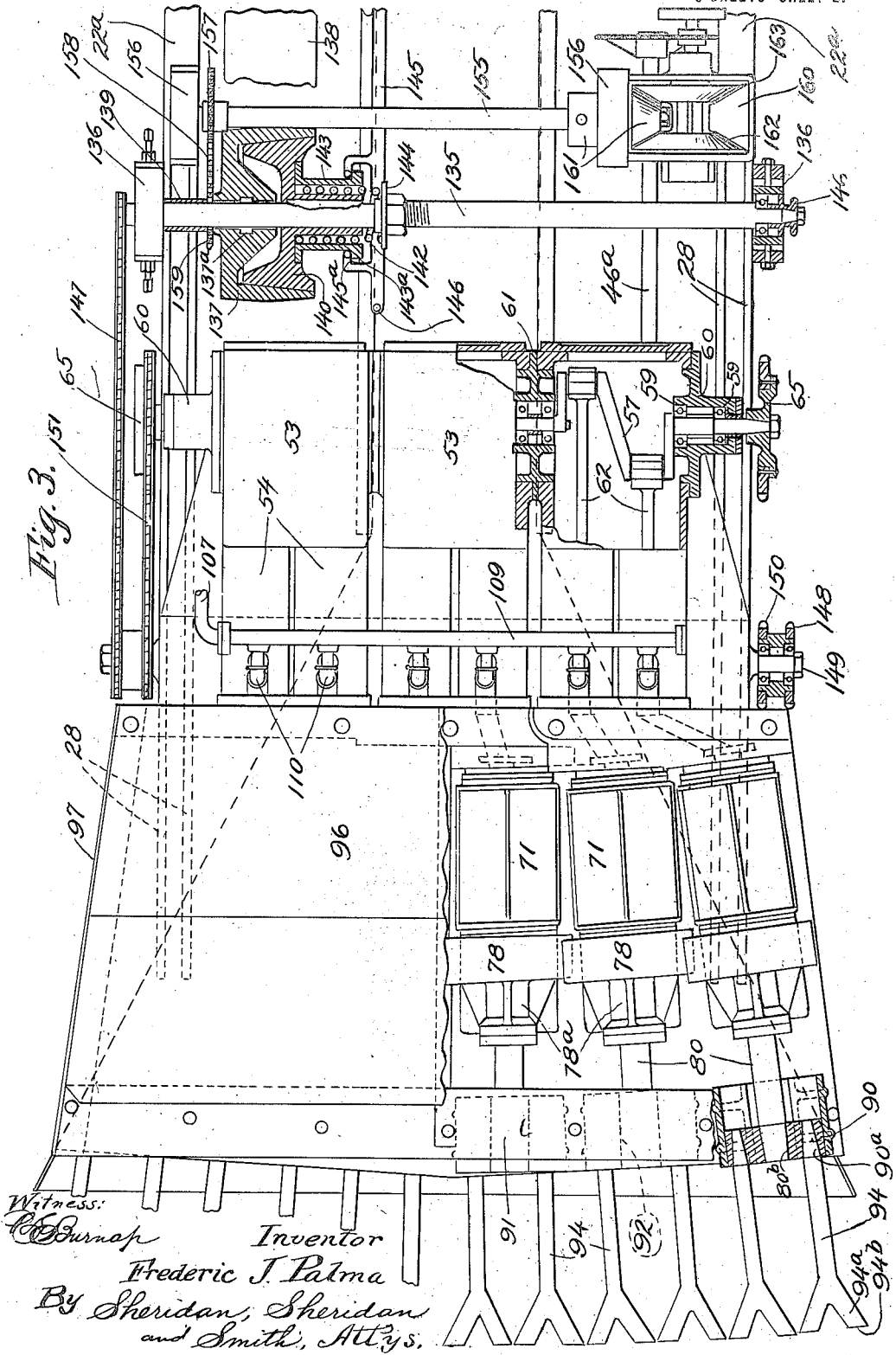

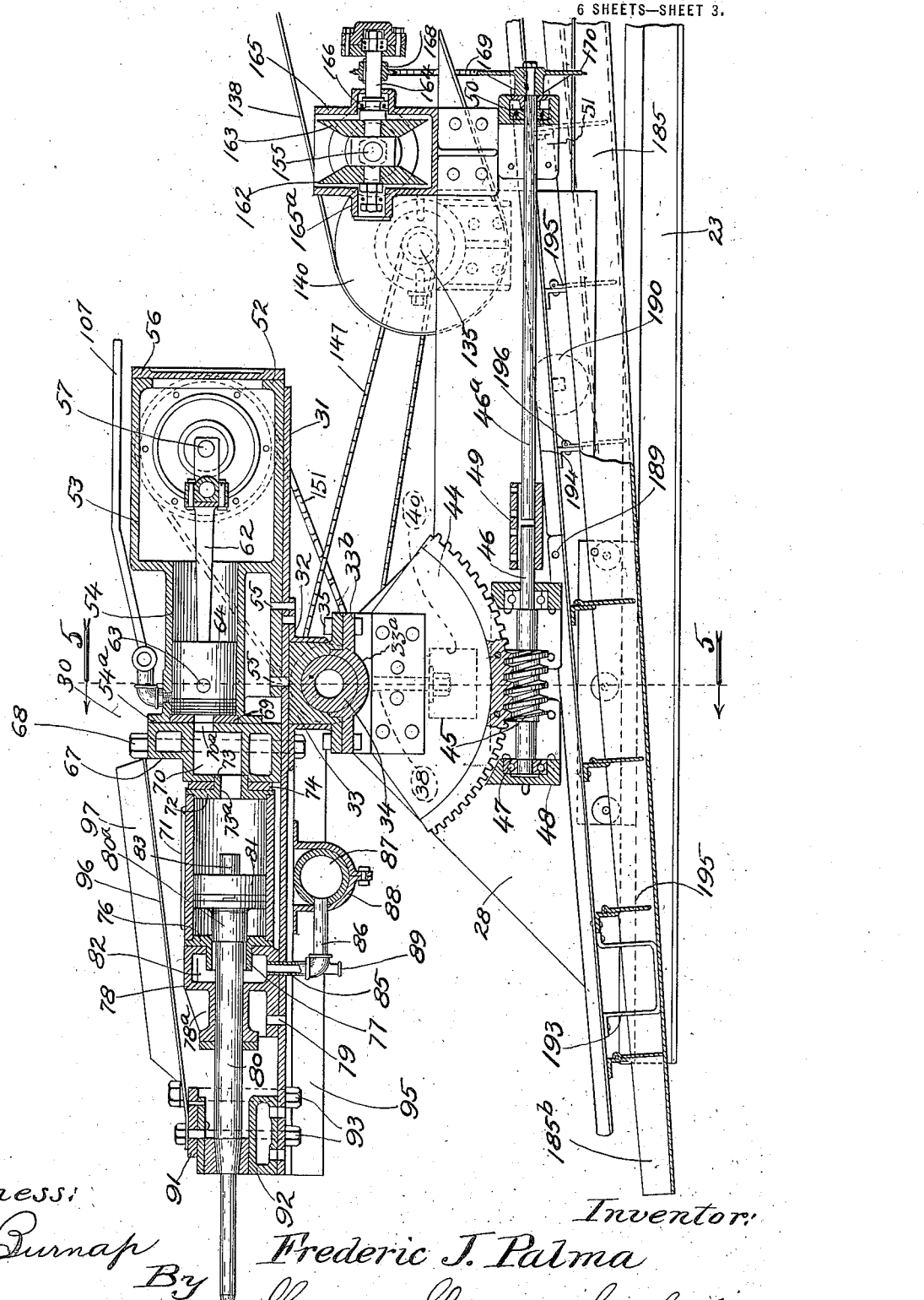

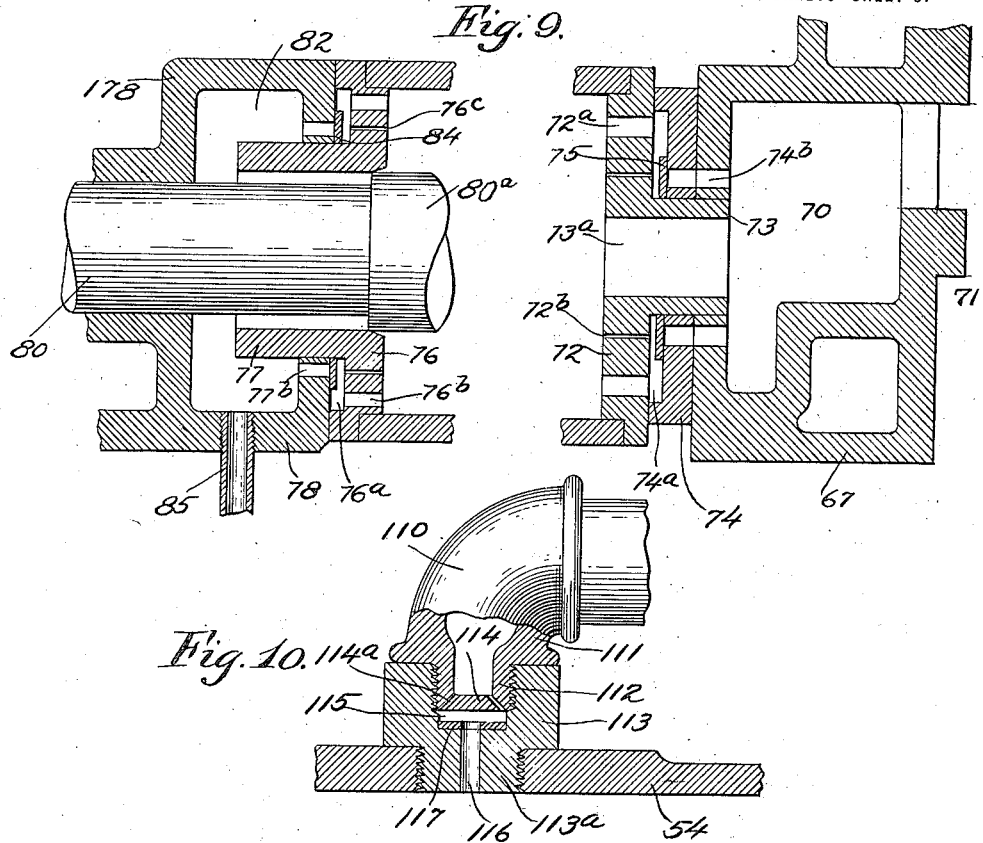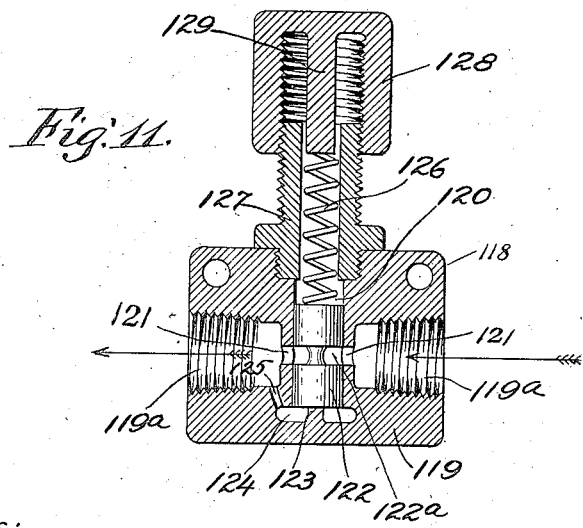

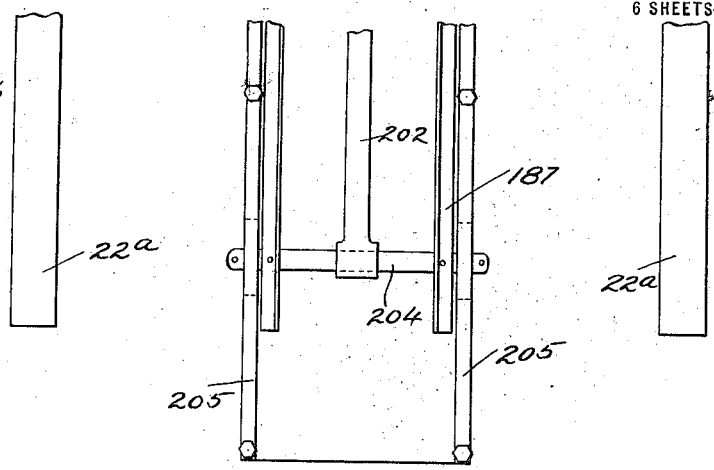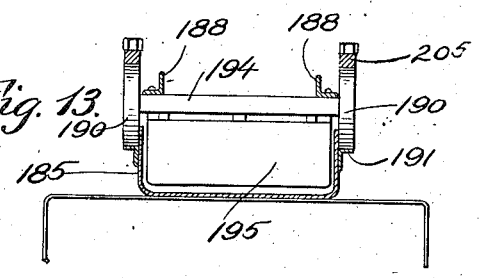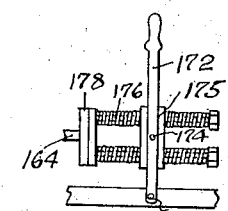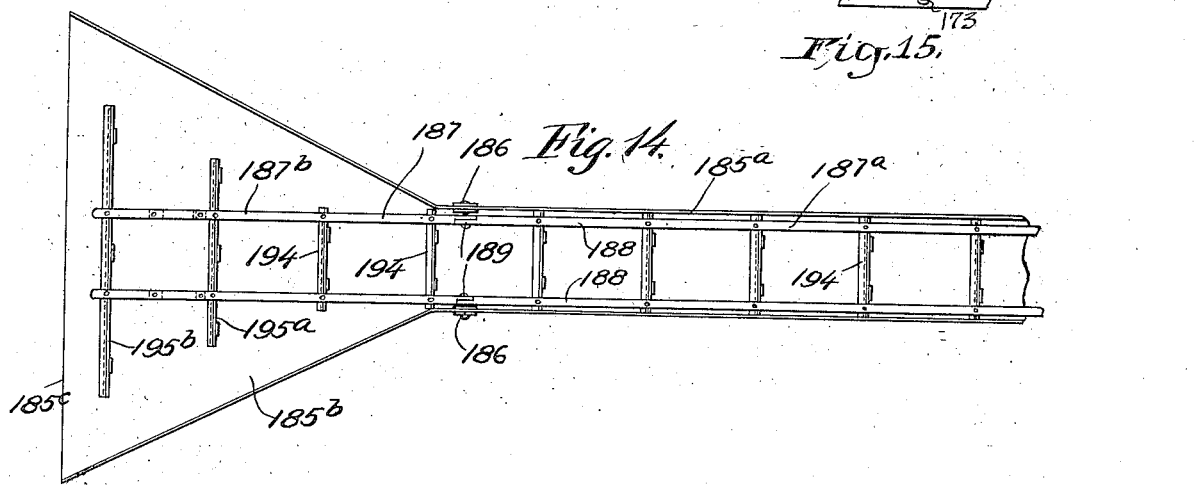

UNITED STATES PATENT OFFICE.

FREDERIC J. PALMA, OF DENVER, COLORADO, ASSIGNOR TO THE UNIVERSAL COAL MACHINE COMPANY, OF PHOENIX, ARIZONA, A CORPORATION OF ARIZONA.

ROCK-CUTTING MACHINE.

1,419,980. Specification of Letters Patent. Patented June 20, 1922.

Application filed April 6, 1918. Serial No. 227,065.

*To all whom it may concern:*

Be it known that I, FREDERIC J. PALMA, a citizen of the United States, residing at Denver, in the county of Denver and State of Colorado, have invented certain new and useful Improvements in Rock-Cutting Machines, of which the following is a specification.

This invention relates to a machine for cutting tunnels and passageways in rock or the like, and the apparatus is particularly adapted for use in cutting entry tunnels in coal mines and other places where a simple and efficient device is desired for cutting away rock or other material and removing it.

The principal object of the invention is to provide a machine having a plurality of reciprocating cutting tools actuated by air pulsations. A further object is to provide rock cutting mechanism comprising a plurality of reciprocating tool pistons actuated by air impulses imparted thereto from a plurality of reciprocating air pulsating pistons. A further object is to provide a machine comprising a plurality of reciprocating tool pistons, in which the pressure on one side of the pistons is maintained substantially constant at all times during the operation of the machine. A further feature of the invention relates to improved means for connecting the tool pistons with the actuating mechanism and to means for controlling the operation of the tool pistons. Another feature is the provision of novel means for mounting the reciprocating tools on a movable head in combination with improved means for controlling the movement of the head. A still further important feature of the invention is the provision of novel means for picking up and carrying away the loose pieces of rock which are broken up by the operation of the reciprocating tools. Other objects relate to various features of construction, operation and arrangement, as will appear more fully hereinafter.

The nature of the invention will be understood from the following specification taken with the accompanying drawings in which one embodiment of the invention is illustrated.

In the drawings—

Figure 1 is a top plan view of my improved machine showing the position thereof in an entry tunnel being cut thereby;

Fig. 2 is a vertical section through the tunnel showing a side elevation of the machine;

Fig. 3 is an enlarged top plan view of the forward end of the machine showing certain parts thereof removed;

Fig. 4 is an enlarged vertical section through the forward end of the machine taken on the line 4—4 of Fig. 5;

Fig. 5 shows a transverse vertical section through the machine taken on the line 5—5 of Fig. 4;

Fig. 6 shows a plan view of the crank shaft by which the air pulsating pistons are actuated;

Fig. 7 shows an end elevation of the shaft illustrated in Fig. 6;

Fig. 8 is an enlarged side elevation of the rear end of the rock removing carrier and guideway;

Fig. 9 is a longitudinal vertical section through one of the tool cylinders and the chambers communicating therewith;

Fig. 10 is an enlarged detail view of one of the valves for controlling the admission of air to the air pulsating cylinders;

Fig. 11 is a detail vertical section through one of the valves for manually controlling the flow of air to the air pulsating cylinders and to the constant air pressure chamber at the forward end of the tool cylinders;

Fig. 12 is a top plan view of the rear end of the chute and carrier by which the loose rock is removed;

Fig. 13 is a transverse sectional view taken on the line 13—13 of Fig. 8;

Fig. 14 is a detail top plan view of the chute and carrier with other parts of the machine removed; and Fig. 15 is a detailed view showing the construction of the clutch operating mechanism.

In Figs. 1 and 2 of the drawings my improved machine is shown in position for cutting the tunnel 20 in the bed of rock or coal 21. The machine comprises a frame 22 which is supported by and moved forward upon a pair of rails 23 mounted on the floor of the tunnel. The frame 22 comprises side-frames 22ª connected by a plurality of transversely extending frame members. Adjacent the rear end of the machine, each side-frame 22ª carries a bracket 24 having mounted therein a flanged-wheel or roller 25 to bear upon one of the supporting rails. The forward end of the machine is carried by a pair of small roller trucks 26, each comprising plates 26ª mounted on opposite sides of the side-frames 22ª and extending downwardly on opposite sides of the rails 23. A plurality of rollers 26ᵇ are mounted on pins or bolts 26ᶜ extending between the plates 26ª, so that as the machine is moved forwardly on the rails it rolls over the trucks 26 which, at the same time, advance forwardly on the rails. The machine may be supported in position within the tunnel and advanced forwardly by degrees as the rock is cut away by any means suitable for that purpose, not shown, many forms of which have heretofore been used in connection with rock cutting devices.

The side-frames 22ª comprise channel-beams 27 which extend forwardly from the rear end of the machine throughout substantially two-thirds of its length, and the forward part of each side-frame is made up of two parallel plates 28 secured to the channel-beams 27 and spaced apart, as illustrated particularly in Figs. 3 and 5. The plates 28 extend downwardly below the plane of the lower edges of the beams 27, and the lower edges of the plate 28 coact with the rollers 26ᵇ, previously described. The forward ends of the plates 28 are tapered or pointed downwardly, as shown at 28ª, and are provided with upwardly extending parts 28ᵇ adapted to support the pivoted cutter head 30. The cutter head comprises a base-plate 31 which underlies the head throughout its area, and this plate is connected by angle members 32 to the bearing members 33 which are adapted to rotate upon the hollow shaft 34. The bearing members 33 comprise removable cap members 33ª which are secured thereto by means of bolts 35 engaging the laterally extending flanges 33ᵇ. The bearing members 33 are spaced apart, and a ring or collar 36 is secured to the shaft 34 between them, so that the lateral thrust on the cutter head is transmitted to the shaft through the roller bearings 37 which are placed between the collar 36 and the end faces of the members 33. The upper parts of the portions 28ᵇ of the plates 28 are recessed, as shown at 28ᶜ, to receive the ends of the shaft 34, and the shaft is held in position on these side-frame members by means of eye-bolts 38 which extend around the ends of the shaft and have their stems projected downwardly between the plates 28 of each side-frame. Apertures 40 are cut through the plates 28 adjacent the lower ends of the eye-bolts which are secured in fixed position by means of washers or clamping plates 41 which coact with the upper walls of the apertures 40 above the nuts 42 which engage the lower ends of the bolts. By adjusting these nuts, the shaft 34 may be rigidly secured in position on the side-frame members. One of the bearing members 33 carries a depending flange 43, which is riveted or otherwise secured to a worm-wheel segment 44 arranged to mesh with a worm 45 fixed on the shaft 46, which extends longitudinally of the machine and is mounted in roller bearings 47 carried in the bracket members 48 secured to one of the plates 28. The shaft 46 is connected by a coupling 49 to an extension 46ª, which has its rear end mounted in roller bearings 50 carried by a bracket 51 attached to the side-frame 22ª, and this extension shaft 46ª is driven by means hereinafter to be described in order to rotate the worm 45 and thereby rock the cutter head about the shaft 34 and bring the cutting tools into engagement with the surface being operated upon.

The plate 31 of the cutter head 30 carries a plurality of castings or frame members 52, each comprising a crank case 53 and a pair of connected air pulsating cylinders 54. These separate castings are arranged side by side on the plate 31, as illustrated particularly in Fig. 5, and are secured thereto by means of rivets 55. The rear ends of the crank cases are closed by removable plates 56. A crank shaft 57, having a number of crank arms corresponding to the number of cylinders 54, is journalled in suitable roller bearings 59 carried by the end bearing members 60 secured to the outer sides of the outermost crank cases and by other bearing members 61 secured to the crank cases and extending through the spaces intervening between them. The various bearings of these crank arms, which are preferably spaced equal distances apart for purposes to be hereinafter described, are connected to the piston rods 62 having their forward ends pivoted at 63 on the pistons 64 adapted to reciprocate in the cylinders 54. The projecting ends of the crank shaft 57 have secured thereto the sprocket wheels 65 through which the crank shaft is driven by mechanism hereinafter to be described.

The forward ends of the cylinders 54 are secured by means of annular flanges 54ª to the block members 67 which are secured to the plate 31 by means of bolts 68, and which, if desired, may be cast integrally. These block members have passageways or chambers 70 formed therein, and they are further provided with cylindrical bosses 69 which fit into the ends of the cylinders 54, and which have openings 70ª leading therethrough and forming communications between the cylinders and the respective chambers 70. These chambers 70 and passageways 70ª are adapted to form independent communications between the various air pulsating cylinders 54 and the corresponding cylinders of the tool pistons.

Mounted on the plate 31 forwardly of the block members 67 are a plurality of tool cylinders 71 arranged preferably in a divergent manner, as illustrated for instance in Fig. 3. Each cylinder 71 comprises a sleeve engaging at one end an end-plate or head 72 having an annular flange 73 projecting therefrom and fitting into an aperture in an adjacent block member 67, so that a communication is formed through the central aperture 73ª of the head to the corresponding chamber 70. A circular plate 74 is mounted around each sleeve 73 between the end plate 72 and the block member 67. Each circular plate 74 is provided with a central cylindrical recess 74ª located adjacent the heads 72, and the chamber formed by this recess is in communication with an adjacent chamber 70 of the member 67 through a plurality of ports 74ᵇ located around the central aperture 73ª. Each recess 74ª is also connected to the interior of its cylinder 71 through a plurality of ports 72ª which are located outwardly from the ports 74ᵇ. A valve member 75, in the form of a washer or the like, constructed preferably of light material, such as aluminum, is mounted in each recess 74ª around the annular flanges 73 and is adapted to close the ports 74ᵇ when in the position illustrated in Fig. 9. A plurality of other small vent holes 72ᵇ extend through the heads 72 opposite the valve 75 to facilitate the closing of the valve for causing a cushioning effect at the end of the reverse stroke of the tool piston as will be more fully disclosed hereinafter. The opposite ends of the sleeves of the cylinders 71 engage the end walls or heads 76, each of which is provided with a centrally located sleeve 77 adapted to fit into a suitable aperture formed in the guide member 78 secured to the plate 31 by means of rivets 79. Each guide member 78 is provided with a forwardly extending part 78ª forming a bearing for the piston rod 80 of the corresponding piston 81 which reciprocates in the connected cylinder 71. The head 76 is provided with a cylindrical recess 76ª forming a chamber adjacent the wall of the head 78 and around the cylinder 77. This chamber communicates with the cylinder 71 through a plurality of ports 76ᵇ and is adapted to be connected to the chamber 82 formed in the guide member 78 by means of a plurality of ports 78ᵇ. A valve member 84 in the form of a circular washer is located in the recess 76ª around the cylinder 77 and is adapted to close the ports 77ᵇ. A plurality of bleed holes 76ᶜ are extended through the member 76 opposite the valve member 84 in order to facilitate the closing of the valve. The bore of each annular sleeve 77 is larger than the diameter of the piston rod 80, but a portion of each piston rod adjacent the connected piston 81 is enlarged, as shown at 80ª, and this enlarged part is adapted to engage and fit the bore of the sleeve 77 when the piston approaches the forward end of the cylinder, thereby closing the valve 84 and the communication through the sleeve between the cylinder and the chamber 82 formed in the guide member 78 and serving to cushion the movement of the piston at the forward end of its stroke in a manner to be more fully described hereinafter. Each piston 81 carries at its other end a cylindrical projection 83 which is adapted to engage the bore 73ª of the end plate 72 when the piston is at the other end of its stroke in order to cause a similar cushioning effect when the valve 75 closes the ports. Pipes 85 lead downwardly from each of the chambers 82 and communicate through other horizontally extending pipes 86 with a constant air pressure chamber 87, which is supported on the underside of the plate 31 by means of brackets 88. Air is supplied to the chamber 87 through a pipe 89 leading from a source of supply located rearwardly on the frame.

The forward end of each piston rod 80 is provided with a tapered part 80ᵇ by which a fixed connection is formed with a cross-head or tool carrier 90 adapted to slide in a rectangular guideway 91 formed in a guide member 92 attached to the base plate 31 by means of bolts 93. Each tool carrier 90 is provided with a pair of sockets 90ª, each adapted to receive a cutting tool 94. These cutting tools may be of any desired form, but I preferably employ tools of the fish-tail type having divergent cutting blades 94ª, especially when using the machine for cutting entry channels in coal mines. By reason of the divergent arrangement of the cylinders 71 and the corresponding arrangement of the cutting tools, it will be apparent that the cutting edges 94ᵇ of the cutting tools form a cutting surface extending across the machine, so that when the machine is in operation the tools engage the surface to be operated upon in the manner illustrated in Fig. 1, and the cutting edges are arranged in a horizontal plane, so that as the tools reciprocate and the cutting member is tilted about its axis, the cutting tools operate upon the rock through a vertically extending arc, as illustrated in Fig. 2. The plate 31, by which the parts of the cutter-head are carried, is reinforced on its underside by means of the angle plates 95, and the tool cylinders and piston rods are covered and protected on their upper sides by means of sheet metal plates 96 which incline downwardly and forwardly from the block members 67 to the upper surfaces of the guide members 92. These sheet metal plates are reinforced along their edges by means of angle members 97.

An air compressor 100 is mounted on the rear end of the machine, being driven by a belt 101 extending from the shaft 102 of the main driving motor 103, which is mounted on the transverse frame members 104. The compressed air from the compressor 100 is stored in a tank 105 and is supplied therefrom through a pipe 106 to two branch pipes 107 and 108. The branch pipe 108 is a continuation of the pipe 89, previously described, leading to the constant air pressure chamber 87 to which the forward ends of the tool cylinders are connected. The other branch pipe 107 leads to a transversely extending feeder pipe 109 mounted above the cylinders 54 and adapted to be connected to these cylinders through various automatic supply valves 110. Each valve 110 consists of an elbow 111 having a depending lug 112 thereon which threadedly engages a cylindrical recess formed in a plug 113. Each plug 113 has a reduced threaded part 113$^a$ engaging an aperture in the walls of the cylinder 54. The central duct of the elbow 111 is closed at its lower end by a wall 114 having outwardly inclined passageways 114$^a$ therethrough which communicate with the chamber 115 between the wall 114 and the lower end of the recess formed in the plug 113. A small duct 116 leads downwardly from each chamber 115 into the connected cylinder 54, and a valve member in the form of a washer 117, preferably of aluminum or the like, is seated in the chamber 115. The aperture through the washer 117 is somewhat less in size than the bore of the duct 116, so that when the desired degree of pressure is maintained in the cylinder 54, the valve member 117 is forced upwardly and closes the ducts 114$^a$. When the pressure in a cylinder 54 falls, the valve member 117 drops downwardly by its own weight and permits air to flow from the passageway 116 into the cylinder.

The flow of air through the pipe 107 to the feeder pipe 109 is controlled by a manually operated valve 118 having the form illustrated particularly in Fig. 11. This valve consists of a member 119 having threaded chambers 119$^a$ extending therethrough from opposite ends to receive the parts of the pipe 107. A transversely extending bore 120 is formed in the member 119 between the chambers 119$^a$, and this bore communicates with each of said chambers through small ducts 121. A communication between the chambers 119$^a$ to the chamber 120 is controlled by a valve member 122 which is in the form of a cylindrical plug having an annular groove 122$^a$ in the central part thereof of the same vertical width as the apertures 121. This plug, when in its lower position, is supported by a lug 123 which extends upwardly from the lower wall of a chamber 124 formed at the lower end of the bore 120. This chamber 124 communicates with the chamber 119$^a$ on the discharge side of the valve through a small duct 125. The plug 122 is forced downwardly toward its lowermost position by means of a coiled spring 126 mounted in a sleeve 127 which communicates with the bore 120 and is secured to the upper side of the member 119. A hand-operated cap member 128 threadedly engages the sleeve 127 and is provided on its inner side with a stem or plunger 129 which extends downwardly within the sleeve 127 and coacts with the upper end of the spring 126. By varying the position of the cap member 128, the compression of the spring 126 may be adjusted to regulate the pressure of the air in the pipe on the discharge side of the valve, thereby regulating the pressure of air in the constant air pressure pipe 109. When the pressure in the pipe 107 rises above the desired maximum, the pressure of the air on the underside of the plug 122 will force the same upwardly and thus restrict the size of the passageway through the openings 121 and the groove 122$^a$, thus effecting a decrease in the flow of air through the valve and the fall of pressure in the pipe 107. A valve 130 similar to the valve 118 is connected in the pipe 108, so that the operator can control the pressure of the air in the constant air pressure chamber 87.

The cutter head 30 is tilted and the pistons thereof are actuated from a main driving shaft 135 which is journalled in suitable roller bearing members 136 carried by the plates 28 of the side-frames. This shaft has rotatably mounted thereon a pulley 137 which is connected by a belt 138 to a pulley 139 fixed on the shaft 102 of the main driving motor 103, previously described. The pulley is held against longitudinal movement on the shaft by an internal collar 137$^a$ and is spaced from the adjacent bearing member 136 by a sleeve 139. The pulley is constructed internally in the form of a cone clutch member adapted to be frictionally engaged by the complementary clutch member 140 which is keyed on the shaft 135 and adapted to slide longitudinally thereon. The clutch member 140 is normally held in engagement with the pulley by means of a coil-spring 142 which lies in a recess formed between the hub of the clutch member 140 and a sleeve 143 which is spaced outwardly from the hub and secured to the face of the clutch member. The coil-spring bears at its other end against a collar 144 fixed to the shaft 135. The sleeve 143 has an annular shoulder 143ª adapted to be engaged by the hooked arms 145ª of an operating lever 145 which is pivoted on the frame at 146 and extends rearwardly to a position where it may be conveniently operated by the operator of the machine. By means of this construction, the shaft 135 may be disconnected from the driving motor whenever desired.

The shaft 135 has secured thereto at its outer ends small sprocket wheels 146 which are connected by chains 147 to sprocket wheels 148 rotatably mounted on the bearings 149 carried by the opposite ends of the shaft 34. Each sprocket wheel 148 has rigidly secured thereto a second sprocket wheel 150, which is connected by a sprocket chain 151 to one of the sprocket wheels 65, previously referred to, which are secured to the opposite ends of the crank shaft 57. In this way the crank shaft, by which the air pulsating pistons 54 are operated, is rotated continuously when the main driving shaft 135 is in operation. Owing to the fact that the sprocket wheels 148 and 150 are mounted on the same axis as the cutter head, the tilting of the cutter head about its axis does not interfere with the continued actuation of the crank shaft 57.

The tilting of the cutter head 30 about the shaft 34 is effected through a supplementary driving shaft 155 which extends transversely of the machine rearwardly of and slightly above the shaft 135. The shaft 155 is journalled in bearings 156 carried by the side-frames 22ª, and it has fixed thereon a sprocket wheel 157 which is connected by a chain 158 to a driving sprocket wheel 159 secured to the driving pulley 137, previously described. Since the pulley 137 is in continuous operation during the rotation of the motor 103, it is apparent that the shaft 155 is actuated independently of the actuation of the shaft 135, so that the cutter head may be tilted without simultaneously actuating the cutting tools. The shaft 155 is connected to the shaft 46ª, by which the head 30 is tilted, through a friction clutch designated generally by the numeral 160. This clutch comprises a friction driving cone 161 secured to the end of the shaft 155 and adapted to engage either of two connected friction clutch members 162 and 163, which are secured on a shaft 164. The clutch members 161, 162 and 163 are enclosed within a housing 165 carried by the frame 22, and the shaft 164 is mounted in roller bearings 166, which are mounted in suitable bearing members 165ª carried by the housing. The roller bearings 166 are adapted to slide longitudinally in the bearing members 165ª in order to permit movement of either of the clutch members 162 or 163 into engagement with the driving cone 161. The rotation of the shaft 164 which may thus be reversed as desired is imparted to the shaft 46ª through a sprocket wheel 168 which is keyed on the shaft 164 and connected by a chain 169 to the sprocket wheel 170 secured to the end of the shaft 46ª. It is found that the sprocket chain 169 serves to maintain the sprocket wheel 168 in alinement with the wheel 170 when the shaft 164 is moved longitudinally. The longitudinal movement of the shaft 164 is effected by means of an operating lever 172, which is pivotally mounted on the frame at 173, and pivoted at an intermediate point 174 on a bar 175 mounted on two rods 176 carried by a head 178 fixed on the end of the shaft. Coil springs 179 are mounted on the rods 176 on opposite sides of the bar 175, so that when the lever 172 is operated to push the shaft 164 in either direction the springs relieve sudden impulses which may be imparted to the lever, and serve to equalize the pressure of the clutch members 162 and 163 upon the driving friction cone 161. When the machine is in operation the operator normally holds the lever 172 in the position desired in order to cause the desired angular movement of the cutter head 30, although it will be understood that any suitable means may be adopted for holding the lever 172 in any suitable adjusted position.

The small particles of rock and other debris removed by the operation of the cutting tools are carried away by novel means comprising a chute 185, which is U-shaped in cross section and extends substantially throughout the length of the machine beneath the longitudinal axis thereof, being inclined downwardly and forwardly as illustrated more particularly in Figs. 2 and 4. The sides of the rear portion 185ª of the chute are parallel; but at a point substantially beneath the pulsating pistons 64 the chute diverges, forming an enlarged scoop portion 185ᵇ which is hinged to the rear portion thereof at 186 so that the scoop portion of the chute may be inclined downwardly to any desired level in order to cause the forward edge 185ᶜ thereof to rest upon the floor of the tunnel, whereby the loose materials are gathered up into the chute as the machine is moved forward during its operation.

The loose materials are carried rearwardly in the chute by a reciprocating carrier designated generally by the numeral 187. This carrier comprises two longitudinally extending parallel frame members 188, each of which is formed in two parts hinged at the points 189 adjacent the hinged connections 186 of the two parts of the chute, so that the forward portion 187ᵇ of the carrier may be inclined downwardly to correspond to the position of the portion 185ᵇ of the chute.

The rear portion 187ª of the carrier is provided with supporting wheels or rollers 190, which extend downwardly on the outer sides of the chute 185 and rest upon angle-iron track members 191 which are carried by the chute and which extend forwardly to points adjacent the pivotal connections 186. The forward pivoted part 187ᵇ of the carrier is provided with a pair of runners 193 which are adapted to slide upon the wall of the chute, as shown in Fig. 4. The frame members 188 of the carrier are connected by transversely extending frame members 194 of angle-iron form, each of which has a scraper 195 pivoted at 196 on the rear side thereof some distance above the lower edge of the frame member, so that as the carrier is moved forwardly the scrapers tend to slide over the material carried by the chute, while upon the reverse stroke of the carrier the scrapers coact with the lower edges of the angled members 194 and are thus held in rigid position to engage and move rearwardly the loose materials. The scrapers 195ᵇ in the forward divergent part of the chute are increased in length, as illustrated particularly in Fig. 14. The carrier, so constructed, is actuated by a motor 197 which is carried by the rear portion of the machine and connected by a belt 198 to a pulley 199 fixed on a crank shaft 200 journalled in suitable bearings 201 carried by the frame. This crank shaft has its crank arm journalled in a connecting rod 202, which is pivoted at 203 on a shaft 204 carried by the frame members 188 of the carrier, and this shaft has journalled thereon the wheels or rollers 190ª which rest on the track members 191, previously described, and are engaged on their upper sides by guide members 205 which are carried by the supporting posts 206, so that the rear end of the carrier is held against vertical movement during the reciprocation thereof. The scrapers 195 are preferably spaced apart distances slightly less than the length of throw of the crank arm 202, so that the load carried by one scraper will be picked up by the next scraper which passes over it on the next succeeding forward movement of the carrier. In this way all of the material removed by the reciprocating cutters during the operation of the machine is picked up and carried rearwardly between the side frame members to a position at the rear end of the machine, where it may be disposed of in any desired manner.

In the operation of the invention the machine is mounted on the rails 23, mounted on the level of the floor of the tunnel to be cut by the machine, and the electric controlling devices for the motors 103 and 197 are preferably mounted separately from the frame of the machine and connected to the motors through flexible cables, which permit the forward travel of the machine by any means adapted for that purpose. The clutch member 140 being normally in engagement with the pulley 137, the crank shaft 57 of the pulsating air pistons will operate to reciprocate these pistons, and thereby effect the operation of the cutting tools 94. At the same time the operator may manipulate the lever 172 to cause the cutter head 30 to oscillate about the shaft 34, and thus operate upon the rock through a vertically extending arc. The operation of each tool piston is effected by the pulsations of air in the corresponding cylinders 71 and 54, which are interconnected through one of the chambers 70, and this operation will now be described for the mechanism connected with one cutting tool only.

Assuming that the piston 64 is at the rear end of its stroke the space in the cylinder 54 ahead of the piston is then filled with air under pressure, controlled through one of the valves 110, connected to the constant air pressure pipe 109 which in turn is controlled by the manually operated valve 118. The normal air pressure within the cylinder may be of any desired value, but it may preferably be adjusted to the minimum which will do the work required. The reciprocating movements of the piston 64 cause pulsations of the air between this piston and the tool piston 81 in the connected cylinder 71, so that the tool piston and tool carried thereby are reciprocated and used to engage intermittently the surface of the rock being operated upon. The normal stroke of the tool piston is between the two cushion chambers, and the comparatively large cushion chambers are provided at the opposite ends of the tool cylinder to take care of abnormal conditions and prevent metallic contact between the tool piston and its cylinder heads when the energy of the tool piston is not absorbed by striking against the material that is to be cut or when any abnormal condition arises. Assuming that the projection 83 on the piston 81 has entered the passageway 73ª in the cylinder head 72, the pressure of the air in the chamber 70, due to the pulsations of the piston 64, causes the valve member 75 to open and permit air to pass through the passageway 74ᵇ, 74ª, and 72ª into the cylinder 71 before the projection 83 passes out of the passageway 73ª. The pressure of the air is thus brought to bear upon the face of the piston 81 to force the same in a forward direction, and at the same time relief is provided for the reduced pressure which would otherwise be produced in the cylinder 71 before the part 83 passes out of the passageway 73ª. The piston 81 then continues its forward travel until the cutting tool 94 impacts with the surface of the rock being operated upon. If the cutting tool does not engage the surface of the rock before the tool piston reaches the forward limit of its travel, the enlarged part 80ª of the tool piston engages the bore of the cylinder 77 carried by the head 76, and at the same time the air rushing out of the space in the cylinder 71 at the left of the tool piston, as viewed in Fig. 4, passes through the bleed holes 76ᶜ and causes the valve member 84 to be forced to the left, thereby closing the port 77ᵇ. A quantity of air is thus entrapped between the forward face of the piston 81 and the head 76, so that the tool piston is cushioned at the forward limit of its stroke and compensation is made for unequalities in the stroke of the piston. When the tool piston makes a return stroke, any abnormal movement thereof is cushioned at the rear end of the tool cylinder by the operation of the projection 83 and the valve member 75 in entrapping a quantity of air in the space between the head 72 and the piston 81, it being apparent that as the cylindrical projection engages the bore 73ª, the air rushing through the bleed holes 72ᵇ will cause the valve member 75 to close the passageway 74ᵇ. After the tool piston has started on its return stroke, the constant air pressure in the chamber 87 and the connected chamber 82 acts upon the valve member 84 to open the same and permit air to flow through the passageway 77ᵇ, 76ª and 76ᵇ into the cylinder 71 on the forward side of the tool piston. In practice it is preferable to so proportion and adjust the parts as to produce a condition wherein the pulsator piston is at the forward end of its travel at substantially the same time that the tool piston is at the rear end of its travel, and still retain regularity of action. As stated before, the chambers 82 in the block members 78 are all interconnected to the pipes 85—86 and the chamber 87, and the crank arms of the several pulsating pistons 64 are so spaced and timed in their movements that the pressure and volume of the air in the chamber 87 and connected parts is maintained substantially constant, so that the rearward movements of the two pistons are effected by the substantially constant pressure. The reciprocation of each tool piston in the manner described is dependent upon the displacement of the pulsating piston, upon the air pressure in the space between the pulsating piston and the tool piston, and upon the weight, area, speed, and length of stroke of the tool piston, so that it is desirable that the mean pressure in the chamber between the pulsating piston and the tool piston, and the constant pressure in the chamber 87 be under the control of the operator, and this control is provided by means of the manually operated valves 118 and 130 located in the air pipes 107 and 108, respectively. The automatic valves 110, which are connected between the feeder pipe 109 and the respective pulsating cylinders are normally closed when the pressures within the pulsating pistons are up to the desired minimum as determined by the control valve 118, but when this pressure falls the valve members 117 drop by gravity and permit air to flow into the cylinders. By the construction described the air pressure in the various cylinders may be maintained and controlled as desired to secure a perfect control of the tool pistons, due to the pulsations of air on the rear faces thereof. Although the machine is described as operated by air pulsations, it will be understood that any other suitable fluid may be substituted in place of air. As the various cutting tools are reciproated by this actuating mechanism the cutter head is revolved about its shaft to engage various parts of the rock surface, and at the same time the carrier mechanism previously described operates to pick up the loose materials and carry them to a point adjacent the rear end of the machine.

Although I have shown and described a particular form of the invention for purposes of illustration, it will be understood that it may be constructed in widely different forms without departing from the scope of the invention as defined in the appended claims.

What I claim is:

1. In a machine of the class described, the combination with a plurality of cylinders each having a tool piston mounted therein, of means comprising pulsating piston mechanism for producing reciprocation of said tool pistons by fluid pulsations, and a source of fluid under constant pressure common to all of said cylinders for returning said tool pistons after their forward strokes.

2. In a machine of the class described, a movable cutter head comprising a plurality of tool cylinders and a plurality of pulsator cylinders mounted as a unitary movable structure, each of said tool cylinders being connected directly to one of said pulsator cylinders through apertures in their end walls, a plurality of pulsator pistons each mounted in one of said pulsator cylinders, a plurality of tool pistons each mounted in one of said tool cylinders, and means for actuating said pulsator pistons to effect the reciprocation of said tool pistons.

3. In a machine of the class described, a cutter-head comprising a plurality of cylinders, tool pistons mounted in said cylinders, and means comprising a plurality of other cylinders each connected to one of said first-named cylinders for producing reciprocation of said pistons by air pulsations, said pistons being forced in one direction by a substantially constant air pressure.

4. In a machine of the class described, a movable cutter head comprising a plurality of tool cylinders, a plurality of pulsator cylinders each connected to one of said tool cylinders, a plurality of pulsator pistons each mounted in one of said pulsator cylinders, a plurality of tool pistons each mounted in one of said tool cylinders, means for actuating said pulsator pistons, a constant pressure air chamber, each of said tool cylinders having an aperture in its wall communicating with said constant pressure air chamber, and means actuated by each of said tool pistons to enter one of said apertures and thereby entrap a portion of the air in the tool cylinder adjacent the end of the stroke of the piston therein.

5. In a machine of the class described, a cutter-head comprising a plurality of tool cylinders, pistons mounted in said cylinders, a plurality of other cylinders each connected to one of said first-named cylinders, pulsator pistons mounted in said second-named cylinders, means for actuating said pulsator pistons to compress the air in the chambers of the connected cylinders and thereby actuate said first-named pistons, and means for entrapping a portion of the air in each tool cylinder adjacent the forward end of the stroke of the piston mounted therein to provide a cushioning effect.

6. In a machine of the class described, a cutter-head comprising a plurality of tool cylinders, pistons mounted in said cylinders, a plurality of other cylinders each connected to one of said tool cylinders, pulsator pistons mounted in said second-named cylinders, means for actuating said pulsator pistons to compress the air in the chambers of the connected cylinders and thereby actuate said first-named pistons, and a constant pressure fluid chamber connected to the forward ends of all of said tool cylinders.

7. In a machine of the class described, a cutter-head comprising a plurality of tool cylinders, pistons mounted in said cylinders, a plurality of other cylinders each connected to one of said first-named cylinders, pulsator pistons mounted in said second-named cylinders, means for actuating said pulsator pistons to compress the air in the chambers of the connected cylinders and thereby actuate said first-named pistons, and a chamber for compressed fluid connected to the forward ends of all of said tool cylinders, the reciprocation of said second-named pistons being timed to maintain a substantially constant volume of air in said compressed fluid chamber.

8. In a machine of the class described, a cutter-head comprising a plurality of tool cylinders, pistons mounted in said cylinders, a plurality of other cylinders each connected to one of said first-named cylinders, pulsator pistons mounted in said second-named cylinders, means for actuating said pulsator pistons to compress the air in the chambers of the connected cylinders and thereby actuate said first-named pistons, a chamber for compressed fluid connected to the forward ends of all of said tool pistons, the reciprocation of said second-named pistons being timed to maintain a substantially constant volume of air in said chamber connected to the forward ends of said tool cylinders, and means for regulating the pressure in said chamber.

9. In a machine of the class described, a cutter-head comprising a plurality of tool cylinders, a plurality of pulsator cylinders, each of said tool cylinders communicating with one of said pulsator cylinders through an aperture in its end wall, a plurality of pulsator pistons each located in one of said pulsator cylinders, a plurality of tool pistons each located in one of said tool cylinders, means for actuating said pulsator pistons, and means carried by each of said tool pistons to enter one of said apertures and thereby entrap a portion of the air in the tool cylinder adjacent the rear end of the stroke of the tool piston mounted therein.

10. In a machine of the class described, a cutter-head comprising a plurality of tool cylinders, pistons mounted in said tool cylinders, a plurality of pulsator cylinders, means for independently connecting each of said pulsator cylinders with one of said tool cylinders, pulsator pistons each mounted in one of said pulsator cylinders, means for actuating said pulsator pistons whereby the air between each pulsator piston and a tool piston is compressed and produces a forward stroke of the latter, air pressure chambers connected to the forward ends of said tool cylinders to return said tool pistons, and means for cushioning said tool pistons at each end of their strokes.

11. In a machine of the class described, a cutter-head comprising a plurality of tool cylinders, pistons mounted in said tool cylinders, a plurality of pulsator cylinders, means for independently connecting each of said pulsator cylinders with one of said tool cylinders, pulsator pistons each mounted in one of said pulsator cylinders, means for actuating said pulsator pistons whereby the air between each pulsator piston and a tool piston is compressed and produces a forward stroke of the latter, air pressure chambers connected to the forward ends of said tool cylinders to return said tool pistons, and means for entrapping a portion of the air in each tool cylinder adjacent each end of the stroke of the tool piston mounted therein to cause a cushioning effect.

12. In a machine of the class described, a cutter-head comprising a plurality of tool cylinders, pistons mounted in said tool cylinders, a plurality of pulsator cylinders, means for independently connecting each of said pulsator cylinders with one of said tool cylinders, pulsator pistons each mounted in one of said pulsator cylinders, means for actuating said pulsator pistons whereby the air between each pulsator piston and a tool piston is compressed and produces a forward stroke of the latter; air pressure chambers connected to the forward ends of said tool cylinders to return said tool pistons, means for entrapping a portion of the air in each tool cylinder adjacent each end of the stroke of the tool piston mounted therein to cause a cushioning effect, and auxiliary means for permitting air to enter the chambers in which the air is entrapped in said tool cylinders after the respective limits of travel of the tool pistons have been reached.

13. In a machine of the class described, a cutter-head comprising a base plate, a plurality of frame members mounted on said base plate, said frame members comprising a plurality of pulsator cylinders, pulsator pistons mounted in said cylinders, means carried by said frame members for actuating said pistons in a continuous cycle, and a plurality of tool cylinders each connected to one of said pulsator cylinders to be actuated thereby.

14. In a machine of the class described, a cutter-head comprising a base plate, a plurality of frame members mounted on said base plate, said frame members comprising a plurality of pulsator cylinders, pulsator pistons mounted in said cylinders, means carried by said frame members for actuating said pistons in a continuous cycle, a plurality of tool cylinders each connected to one of said pulsator cylinders to be actuated thereby, a plurality of reciprocating tools actuated by said tool cylinders, and means carried by said base plate for guiding said tools.

15. In a machine of the class described, a cutter-head comprising a base plate, a plurality of frame members mounted on said base plate, said frame members comprising a plurality of pulsator cylinders, pulsator pistons mounted in said cylinders, means carried by said frame members for actuating said pistons in a continuous cycle, a plurality of tool cylinders each connected to one of said pulsator cylinders to be actuated thereby, a plurality of tool carriers slidably mounted on said base plate and operatively connected to said tool cylinders, and cutting tools carried by said tool carriers.

16. In a machine of the class described, a cutter-head comprising a base plate, a plurality of frame members mounted on said base plate, said frame members comprising a plurality of pulsator cylinders, pulsator pistons mounted in said cylinders, means carried by said frame members for actuating said pistons in a continuous cycle, a plurality of tool cylinders each connected to one of said pulsator cylinders to be actuated thereby, and a plurality of cutting tools actuated by said tool cylinders, said cutting tools having their cutting edges arranged in a curve.

17. In apparatus of the class described, a cutter-head comprising a base plate, frame members mounted on said base plate and comprising a plurality of pulsator cylinders, pulsator pistons mounted in said cylinders, block members mounted on said base plate and having chambers communicating with said pulsator cylinders, tool cylinders mounted on said base plate in communication with the chambers of said block members, tool pistons mounted in said tool cylinders, and means for supplying compressed fluid to said pulsator cylinders and said tool cylinders.

18. In a machine of the class described, a cutter-head comprising a tool cylinder, a pulsator cylinder, a pulsator piston mounted in said pulsator cylinder, means for actuating said pulsator cylinder, means for connecting the forward end of said pulsator cylinder with the rear end of said tool cylinder, a tool piston mounted in said tool cylinder, said tool cylinder having apertures in the end walls thereof, an air-pressure chamber connected to said tool cylinder through the aperture in the forward end wall thereof, and means carried by said tool piston for closing the apertures in said end walls adjacent the limits of its stroke.

19. In a machine of the class described, a cutter-head comprising a tool cylinder, a pulsator cylinder, a pulsator piston mounted in said pulsator cylinder, means for actuating said pulsator cylinder, means for connecting the forward end of said pulsator cylinder with the rear end of said tool cylinder, a tool piston mounted in said tool cylinder, said tool cylinder having apertures in the end walls thereof, an air-pressure chamber connected to said tool cylinder through the aperture in the forward end wall thereof, means carried by said tool piston for closing the apertures in said end walls adjacent the limits of its stroke, and independent auxiliary valve mechanism for controlling the communication between said tool cylinder and said pulsator cylinder.

20. In a machine of the class described, a cutter-head comprising a tool cylinder, a pulsator cylinder, a pulsator piston mounted in said pulsator cylinder, means for actuating said pulsator cylinder, means for connecting the forward end of said pulsator cylinder with the rear end of said tool cylinder, a tool piston mounted in said tool cylinder, said tool cylinder having apertures in the end walls thereof, an air-pressure chamber connected to said tool cylinder through the aperture in the forward end wall thereof, means carried by said tool piston for closing the apertures in said end walls adjacent the limits of its stroke, independent auxiliary valve mechanism for controlling the communication between said tool cylinder and said pulsator cylinder, and other independent auxiliary valve mechanism for controlling the communication between the forward end of said tool piston and said air-pressure chamber.

21. In a machine of the class described, a tool cylinder having an aperture in each of its end walls, a tool piston mounted in said cylinder, means communicating with said cylinder through one of said apertures for producing a forward stroke of said piston, means communicating with said cylinder through the other of said apertures for producing a reverse stroke of said piston, and projecting members carried by said piston and adapted to enter said apertures and thereby entrap a portion of the air in said cylinder adjacent each end of the stroke of said piston.

22. In a machine of the class described, a tool cylinder having an aperture in each of its end walls, a tool piston mounted in said cylinder, means communicating with said cylinder through one of said apertures for producing a forward stroke of said piston, means communicating with said cylinder through the other of said apertures for producing a reverse stroke of said piston, projecting members carried by said piston and adapted to enter said apertures and thereby entrap a portion of the air in said cylinder adjacent each end of the stroke of said piston, and auxiliary means for effecting the initial movement of said piston after it has reached the end of its stroke and while one of said members is engaging one of said apertures.

23. In a machine of the class described, a cylinder, a piston mounted in said cylinder, said cylinder having an aperture in its end wall, means for introducing compressed fluid through said aperture to effect the movement of said piston, a member extending longitudinally from said piston and adapted to enter said aperture adjacent the end of the reverse stroke of said piston, and means to produce a reverse stroke of said piston.

24. In a machine of the class described, a cylinder, a piston mounted in said cylinder, said cylinder having an aperture in its end wall, means for introducing compressed fluid through said aperture to effect the movement of said piston, a member extending longitudinally from said piston and adapted to enter said aperture adjacent the end of the reverse stroke of said piston, means to produce a reverse stroke of said piston, said cylinder having auxiliary apertures in its end wall, a valve member adapted to close said apertures by the pressure of the entrapped fluid in said cylinder after said member enters said first named aperture, and means to permit the opening of said valve member and the entrance of compressed fluid through said auxiliary apertures to effect the initial forward movement of said piston.

25. In a machine of the class described, an aperture, a block member having a chamber therein, a tubular member forming a communication between said chamber and said cylinder, means for forming an annular chamber around said tubular member between said block member and said cylinder, said block member and said cylinder having apertures in their walls communicating with said annular chamber and forming therewith a plurality of passages between said first named chamber and said cylinder, and an annular valve member mounted in said annular chamber and adapted to close said passages.

26. In a machine of the class described, an aperture, a block member having a chamber therein, a tubular member forming a communication between said chamber and said cylinder, means for forming an annular chamber around said tubular member between said block member and said cylinder, said block member and said cylinder having apertures in their walls communicating with said annular chamber and forming therewith a plurality of passages between said first named chamber and said cylinder, an annular valve member mounted in said annular chamber and adapted to close said passages, a piston mounted in said cylinder, and a projecting member carried by said piston and adapted to enter said tubular member.

27. In a machine of the class described, an aperture, a block member having a chamber therein, a tubular member forming a communication between said chamber and said cylinder, means for forming an annular chamber around said tubular member between said block member and said cylinder, said block member and said cylinder having apertures in their walls communicating with said annular chamber and forming therewith a plurality of passages between said first named chamber and said cylinder, an annular valve member mounted in said annular chamber and adapted to close said passages, a piston mounted in said cylinder, a projecting member carried by said piston and adapted to enter said tubular member, said annular valve member being adapted to be closed by the pressure of the entrapped fluid in said cylinder after said last named member engages said tubular member, auxiliary pin holes leading through the wall of said cylinder opposite said valve member to effect the initial closing movement thereof, and means for introducing compressed fluid into said first named chamber to effect the opening movement of said annular valve member and the movement of said piston.

28. In a machine of the class described, a plurality of tool cylinders, a plurality of pulsator cylinders, a plurality of pulsator pistons each located in one of said pulsator cylinders, a plurality of tool pistons each located in one of said tool cylinders, means for forming a communication between each tool cylinder and one of said pulsator cylinders, means for actuating said pulsator pistons to compress the fluid in said pistons and the communicating passages and thereby actuate said tool pistons, and valve control means for regulating the limits of pressure of the fluid in said cylinders.

29. In a machine of the class described, spaced apart frame members on each side of said machine, an axle supported on said frame members, clamping members extending around said axle and downwardly therefrom between the frame members on each side of said machine, adjustable means connecting said clamping members to said frame members for securing said frame members in position, and a cutter head pivotally mounted on said axle.

In testimony whereof, I have subscribed my name.

FREDERIC J. PALMA.

Witnesses:
F. R. YOCOM,
ELWOOD DE WEES.